United States Patent
Wang et al.

(10) Patent No.: US 9,866,061 B2
(45) Date of Patent: Jan. 9, 2018

(54) POWER SUPPLY APPARATUS WITH PROTECTION FUNCTION AND REDUNDANT POWER SUPPLY SYSTEM

(71) Applicant: Chicony Power Technology Co., Ltd., New Taipei (TW)

(72) Inventors: Tzu-Hung Wang, New Taipei (TW); Wei-Yuan Chen, New Taipei (TW); Che-Hao Chang, New Taipei (TW); Zhi-Hong Lu, New Taipei (TW); Hai-Wen Chang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 286 days.

(21) Appl. No.: 14/947,562

(22) Filed: Nov. 20, 2015

(65) Prior Publication Data
US 2017/0149271 A1  May 25, 2017

(51) Int. Cl.
*H02J 9/00* (2006.01)
*H02M 1/32* (2007.01)
*H02M 3/335* (2006.01)

(52) U.S. Cl.
CPC ............... *H02J 9/00* (2013.01); *H02M 1/32* (2013.01); *H02M 3/335* (2013.01)

(58) Field of Classification Search
None
See application file for complete search history.

(56) References Cited

U.S. PATENT DOCUMENTS

| | | | |
|---|---|---|---|
| 2014/0285099 A1* | 9/2014 | Akahoshi | H05B 33/0815 315/200 R |
| 2015/0191086 A1* | 7/2015 | Sugahara | B60L 3/00 307/10.1 |
| 2015/0295496 A1* | 10/2015 | Chen | H02M 1/32 363/21.18 |
| 2016/0054744 A1* | 2/2016 | Butler | H03F 1/52 323/282 |

* cited by examiner

*Primary Examiner* — Jared Fureman
*Assistant Examiner* — Aqueel Bukhari
(74) *Attorney, Agent, or Firm* — Muncy, Geissler, Olds & Lowe, P.C.

(57) ABSTRACT

A power supply apparatus with a protection function includes a pulse width modulation control unit, a pulse width modulation detecting unit, a switch unit and a feedback circuit. The feedback circuit detects a bus voltage. When the feedback circuit detects that the bus voltage is greater than a predetermined voltage, the feedback circuit sends an informing signal to the pulse width modulation control unit. The pulse width modulation control unit adjusts a duty cycle of a pulse width modulation signal and sends the pulse width modulation signal to the pulse width modulation detecting unit. When the pulse width modulation detecting unit detects that the duty cycle of the pulse width modulation signal is less than a predetermined cycle, the pulse width modulation detecting unit turns off the switch unit to stop outputting power to avoid a reverse current phenomenon.

13 Claims, 7 Drawing Sheets

POWER SUPPLY APPARATUS WITH PROTECTION FUNCTION AND REDUNDANT POWER SUPPLY SYSTEM

BACKGROUND OF THE INVENTION

Field of the Invention

The present invention relates to a power supply apparatus and a power supply system, and especially relates to a power supply apparatus with a protection function and a redundant power supply system.

Description of the Related Art

If plural related art power supplies are applied to a server system, the related art power supplies are connected in parallel. The main purpose of the technical content mentioned above is the concept of the redundant power. When the outputs of the related art power supplies are connected together, if one of the related art power supplies is failed, the other normal related art power supplies connected in parallel cannot be used either. It is very inconvenient.

SUMMARY OF THE INVENTION

In order to solve the above-mentioned problems, an object of the present invention is to provide a power supply apparatus with a protection function.

In order to solve the above-mentioned problems, another object of the present invention is to provide a redundant power supply system.

In order to achieve the object of the present invention mentioned above, the power supply apparatus comprises a pulse width modulation control unit, a pulse width modulation detecting unit, a switch unit and a feedback circuit. The pulse width modulation detecting unit is electrically connected to the pulse width modulation control unit. The switch unit is electrically connected to the pulse width modulation detecting unit. The feedback circuit is electrically connected to the pulse width modulation control unit and the switch unit. The feedback circuit detects a bus voltage. When the feedback circuit detects that the bus voltage is greater than a predetermined voltage, the feedback circuit sends an informing signal to the pulse width modulation control unit. After the pulse width modulation control unit receives the informing signal, the pulse width modulation control unit adjusts a duty cycle of a pulse width modulation signal and sends the pulse width modulation signal to the pulse width modulation detecting unit. When the pulse width modulation detecting unit detects that the duty cycle of the pulse width modulation signal is less than a predetermined cycle, the pulse width modulation detecting unit turns off the switch unit to stop outputting power.

In order to achieve the object of the present invention mentioned above, the redundant power supply system comprises a plurality of power supply apparatuses with protection functions. The power supply apparatuses are connected in parallel and have a bus voltage and together output a direct current power. The power supply apparatus comprises a pulse width modulation control unit, a pulse width modulation detecting unit, a switch unit and a feedback circuit. The pulse width modulation detecting unit is electrically connected to the pulse width modulation control unit. The switch unit is electrically connected to the pulse width modulation detecting unit. The feedback circuit is electrically connected to the pulse width modulation control unit and the switch unit. The feedback circuit detects a bus voltage. The switch unit comprises a secondary side rectifying switch subunit, an output switch subunit and a first capacitor. The secondary side rectifying switch subunit is electrically connected to the pulse width modulation detecting unit. The output switch subunit is electrically connected to the secondary side rectifying switch subunit, the pulse width modulation detecting unit and the feedback circuit. The first capacitor is electrically connected to the secondary side rectifying switch subunit and the output switch subunit. When an output voltage of one of the power supply apparatuses is increased abnormally such that the bus voltage is increased abnormally, and the feedback circuit of the normal power supply apparatus detects that the bus voltage is increased abnormally, the feedback circuit of the normal power supply apparatus sends an informing signal to the pulse width modulation control unit. After the pulse width modulation control unit receives the informing signal, the pulse width modulation control unit adjusts a duty cycle of a pulse width modulation signal and sends the pulse width modulation signal to the pulse width modulation detecting unit. When the pulse width modulation detecting unit detects that the duty cycle of the pulse width modulation signal is less than a predetermined cycle, the pulse width modulation control unit turns off the output switch subunit to stop outputting power and to decrease the output voltage. At the same time, the secondary side rectifying switch subunit is turned on, so that the output voltage of the normal power supply apparatus is not decreased to 0 volt.

The advantage of the present invention is that when the bus voltage is greater than the predetermined voltage, and when the duty cycle of the pulse width modulation signal is less than the predetermined cycle, the power supply apparatus stops outputting power to avoid a reverse current phenomenon.

DETAILED DESCRIPTION OF THE INVENTION

Please refer to following detailed description and figures for the technical content of the present invention. The following detailed description and figures are referred for the present invention, but the present invention is not limited to it.

Figure 1:
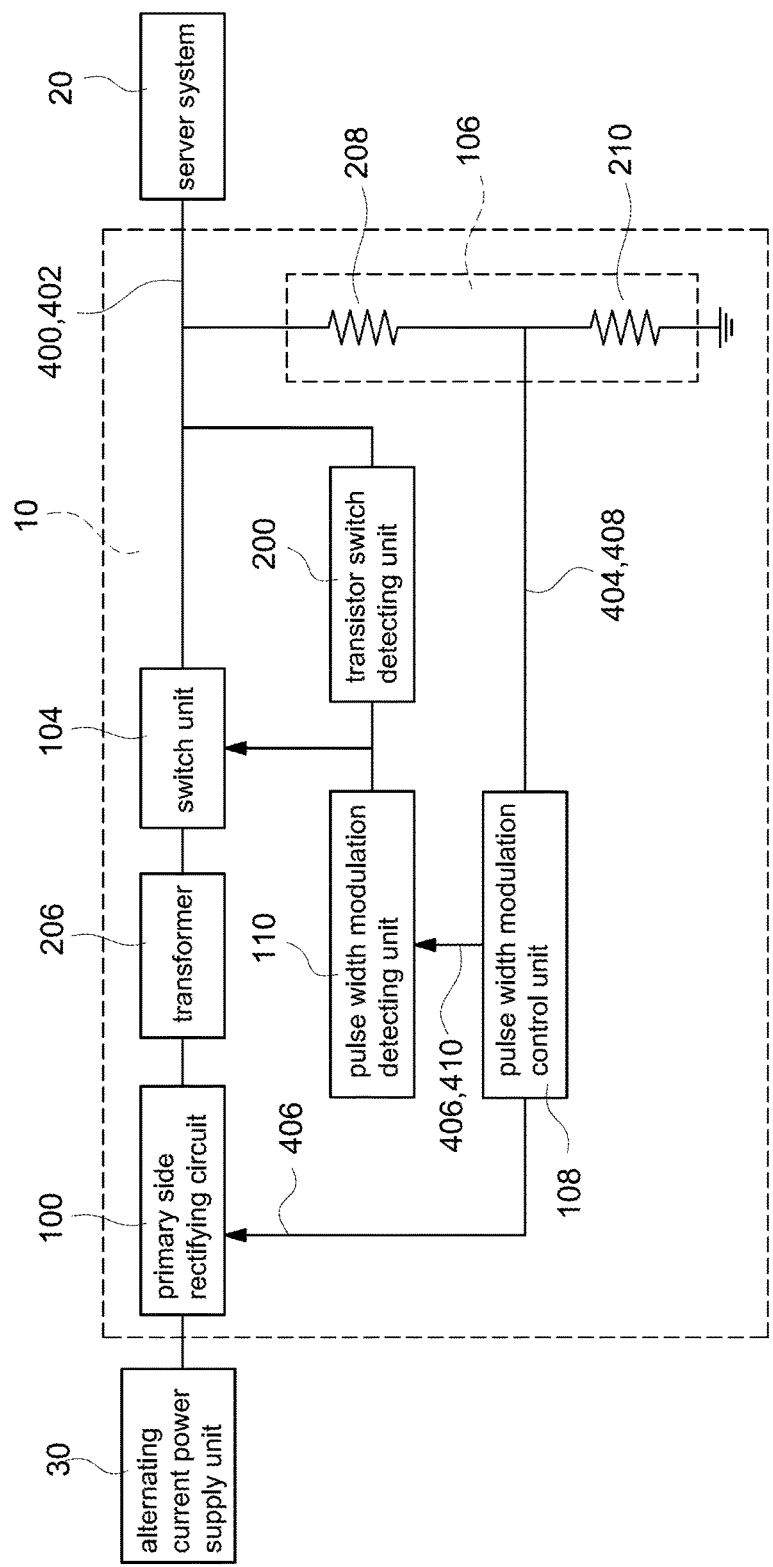
FIG. 1 shows a block diagram of the power supply apparatus with a protection function of the present invention.

FIG. 1 shows a block diagram of the power supply apparatus with a protection function of the present invention. A power supply apparatus 10 with a protection function is applied to a server system 20. The power supply apparatus 10 comprises a pulse width modulation control unit 108, a pulse width modulation detecting unit 110, a switch unit 104, a feedback circuit 106, a transistor switch detecting unit 200, a primary side rectifying circuit 100 and a transformer 206. The feedback circuit 106 comprises a first resistor 208 and a second resistor 210.

The pulse width modulation detecting unit 110 is electrically connected to the pulse width modulation control unit 108. The switch unit 104 is electrically connected to the pulse width modulation detecting unit 110. The feedback circuit 106 is electrically connected to the pulse width modulation control unit 108 and the switch unit 104. The feedback circuit 106 detects an output voltage 400. The transistor switch detecting unit 200 is electrically connected to the pulse width modulation detecting unit 110 and the output switch subunit 202. The transformer 206 is electrically connected to the primary side rectifying circuit 100 and the switch unit 104. The first resistor 208 is electrically connected to the switch unit 104, the pulse width modulation control unit 108 and the transistor switch detecting unit 200. The second resistor 210 is electrically connected to the pulse width modulation control unit 108 and the first resistor 208.

When the feedback circuit 106 detects that the bus voltage 402 is greater than a predetermined voltage, the feedback circuit 106 sends an informing signal 404 to the pulse width modulation control unit 108. After the pulse width modulation control unit 108 receives the informing signal 404, the pulse width modulation control unit 108 adjusts a duty cycle of a pulse width modulation signal 406 and sends the pulse width modulation signal 406 to the pulse width modulation detecting unit 110. When the pulse width modulation detecting unit 110 detects that the duty cycle of the pulse width modulation signal 406 is less than a predetermined cycle, the pulse width modulation detecting unit 110 turns off the switch unit 104 to stop outputting power to avoid a reverse current phenomenon.

An alternating current power supply unit 30 supplies an electric power to the transformer 206 through the primary side rectifying circuit 100. The transformer 206 transforms the electric power to obtain a transformed electric power. The transformer 206 sends the transformed electric power to the switch unit 104. The switch unit 104 outputs the transformed electric power to the server system 20.

Figure 5:
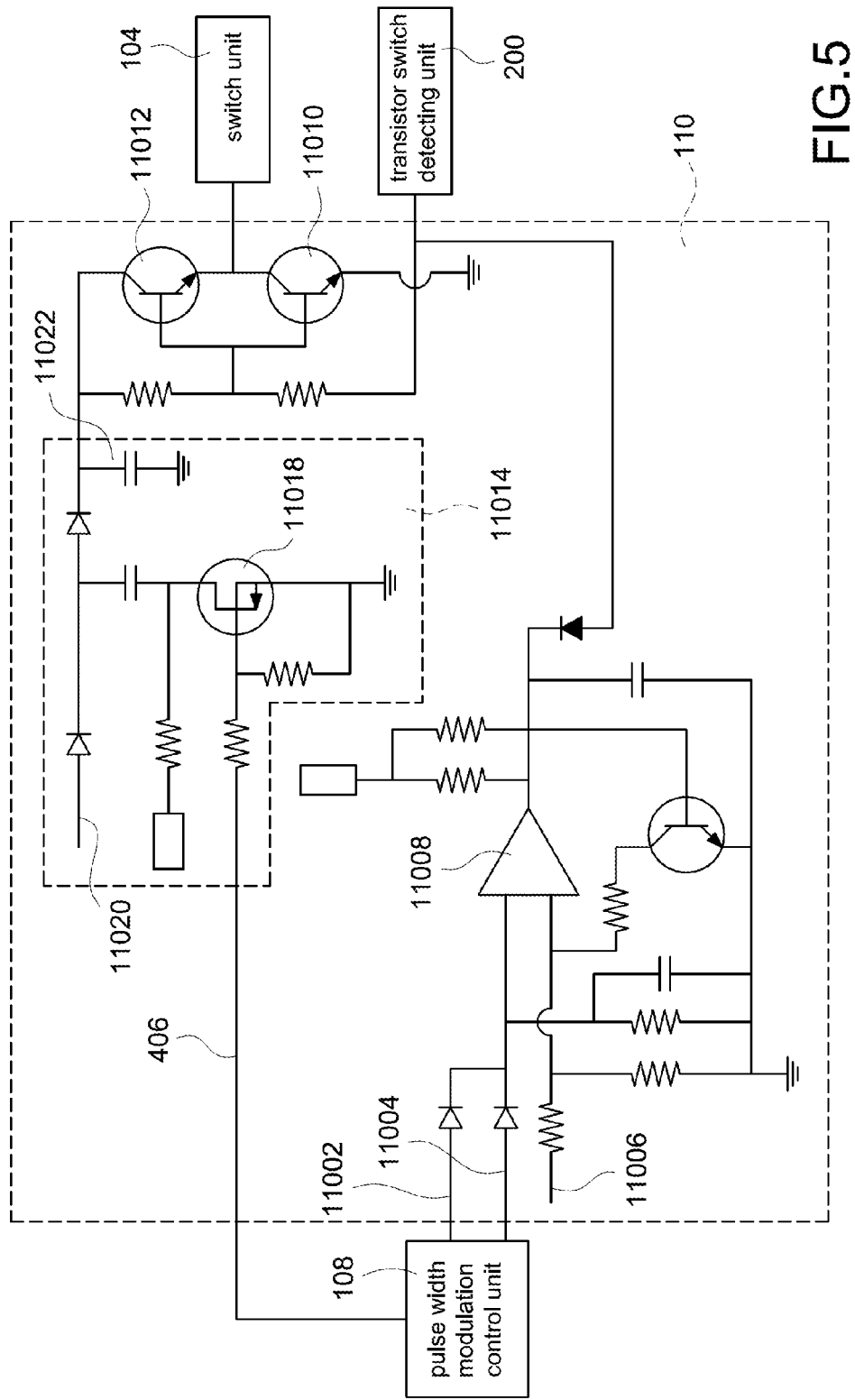
FIG. 5 shows a circuit diagram of the pulse width modulation detecting unit of the power supply apparatus of the present invention.

FIG. 5 shows a circuit diagram of the pulse width modulation detecting unit of the power supply apparatus of the present invention.

The pulse width modulation detecting unit 110 at least comprises a pulse width modulation signal comparator 11008, a first transistor switch subunit 11010, a second transistor switch subunit 11012 and a charge pump subunit 11014. The charge pump subunit 11014 at least comprises a transistor switch component 11018 and a charge pump capacitor 11022.

The first transistor switch subunit 11010 is electrically connected to the pulse width modulation signal comparator 11008. The second transistor switch subunit 11012 is electrically connected to the pulse width modulation signal comparator 11008 and the first transistor switch subunit 11010. The charge pump subunit 11014 is electrically connected to the first transistor switch subunit 11010 and the second transistor switch subunit 11012. The charge pump capacitor 11022 is electrically connected to the transistor switch component 11018.

Moreover, a first pulse width modulation signal 11002 added by a second pulse width modulation signal 11004 forms the pulse width modulation signal 406.

The pulse width modulation signal comparator 11008 compares the pulse width modulation signal 406 with the first level signal 11006 to generate a comparative result. When the comparative result is a low output signal, the low output signal turns off the first transistor switch subunit 11010 and the second transistor switch subunit 11012 to stop outputting power.

Moreover, after the charge pump subunit 11014 receives the pulse width modulation signal 406, when the pulse width modulation signal 406 is abnormal (namely, the duty cycle of the pulse width modulation signal 406 is less than the predetermined cycle), the pulse width modulation signal 406 turns off the transistor switch component 11018. Moreover, a supply voltage 11020 charges the charge pump capacitor 11022 to increase enough voltage to turn on the first transistor switch subunit 11010 and the second transistor switch subunit 11012. When the pulse width modulation signal 406 is normal (namely, the duty cycle of the pulse width modulation signal 406 is greater than or equal to the predetermined cycle), the pulse width modulation signal 406 turns on the transistor switch component 11018, so that the charge pump capacitor 11022 discharge. The charge pump capacitor 11022 which is fully charged turns on the first transistor switch subunit 11010 and the second transistor switch subunit 11012.

Figure 3:
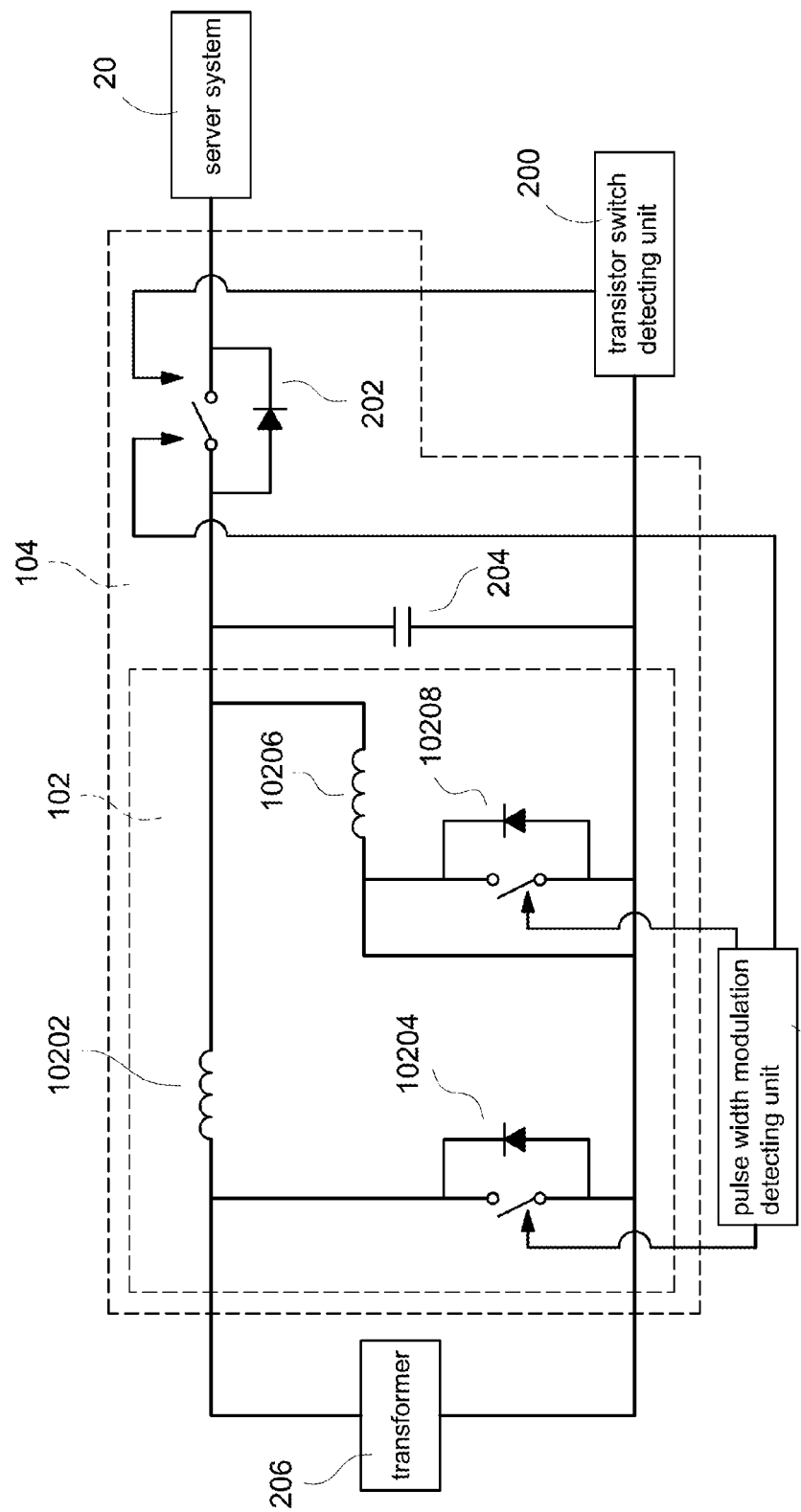
FIG. 3 shows a circuit diagram of the switch unit of the power supply apparatus of the present invention.

FIG. 3 shows a circuit diagram of the switch unit of the power supply apparatus of the present invention.

The switch unit 104 comprises a secondary side rectifying switch subunit 102, an output switch subunit 202 and a first capacitor 204. The secondary side rectifying switch subunit 102 comprises a second inductor 10202, a fifth transistor switch 10204, a third inductor 10206 and a sixth transistor switch 10208.

The output switch subunit 202 is electrically connected to the secondary side rectifying switch subunit 102, the pulse width modulation detecting unit 110 and the transistor switch detecting unit 200. The first capacitor 204 is electrically connected to the secondary side rectifying switch subunit 102 and the output switch subunit 202. The second inductor 10202 is electrically connected to the output switch subunit 202, the first capacitor 204 and the transformer 206. The fifth transistor switch 10204 is electrically connected to the first pulse width modulation signal 11002, the first capacitor 204, the transformer 206, the pulse width modulation control unit 108 and the transistor switch detecting unit 200. The third inductor 10206 is electrically connected to the second inductor 10202, the fifth transistor switch 10204, the output switch subunit 202, the first capacitor 204, the transformer 206 and the transistor switch detecting unit 200. The sixth transistor switch 10208 is electrically connected to the third inductor 10206, the first capacitor 204, the transformer 206, the fifth transistor switch 10204 and the pulse width modulation control unit 108.

When the pulse width modulation detecting unit 110 turns off the switch unit 104 to stop outputting power, the pulse width modulation detecting unit 110 turns off the secondary side rectifying switch subunit 102 or turns off the output switch subunit 202, or in another embodiment, the pulse width modulation detecting unit 110 turns off the secondary side rectifying switch subunit 102 and the output switch subunit 202 at the same time.

When the transistor switch detecting unit 200 detects that the bus voltage 402 is greater than the predetermined voltage, the transistor switch detecting unit 200 turns off the output switch subunit 202 to stop outputting power to avoid the reverse current phenomenon.

Figure 2:
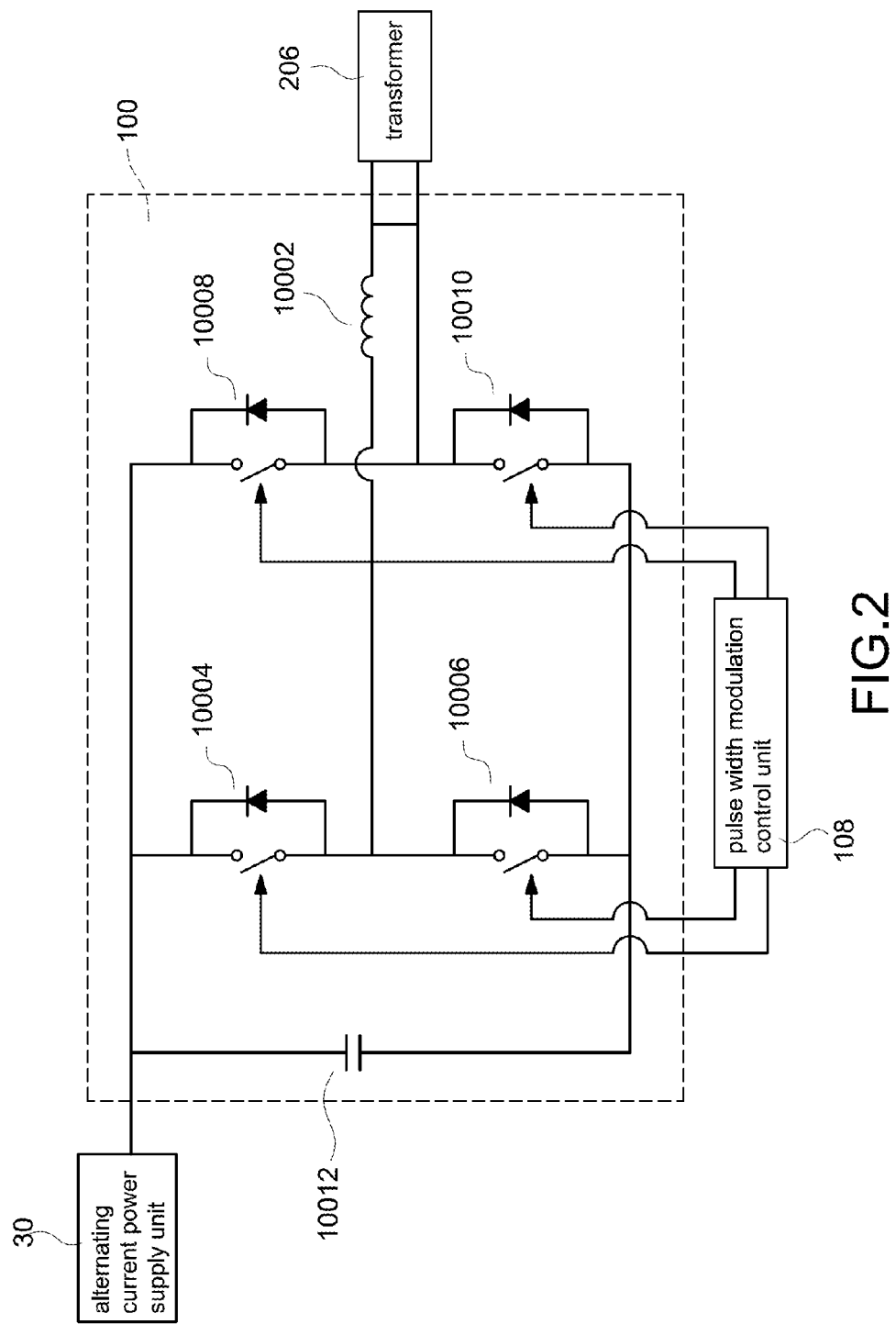
FIG. 2 shows a circuit diagram of the primary side rectifying circuit of the power supply apparatus of the present invention.

FIG. 2 shows a circuit diagram of the primary side rectifying circuit of the power supply apparatus of the present invention. The primary side rectifying circuit 100 comprises a first inductor 10002, a first transistor switch 10004, a second transistor switch 10006, a third transistor switch 10008, a fourth transistor switch 10010 and a second capacitor 10012.

The first transistor switch 10004 is electrically connected to the first inductor 10002 and the pulse width modulation control unit 108. The second transistor switch 10006 is electrically connected to the first inductor 10002, the first transistor switch 10004 and the pulse width modulation control unit 108. The third transistor switch 10008 is electrically connected to the first inductor 10002, the first transistor switch 10004 and the pulse width modulation control unit 108. The fourth transistor switch 10010 is electrically connected to the first inductor 10002, the second transistor switch 10006, the third transistor switch 10008 and the pulse width modulation control unit 108. The second capacitor 10012 is electrically connected to the first transistor switch 10004, the second transistor switch 10006, the third transistor switch 10008 and the fourth transistor switch 10010.

When the primary side rectifying circuit 100 is a full bridge rectifying circuit, the first transistor switch 10004 and the fourth transistor switch 10010 are a first set switch, and the second transistor switch 10006 and the third transistor switch 10008 are a second set switch. The pulse width modulation control unit 108 sends the first pulse width modulation signal 11002 and the second pulse width modulation signal 11004 to the first set switch and the second set switch respectively to control the primary side rectifying circuit 100. Moreover, the first pulse width modulation signal 11002 and the second pulse width modulation signal 11004 are complementary.

Figure 6:
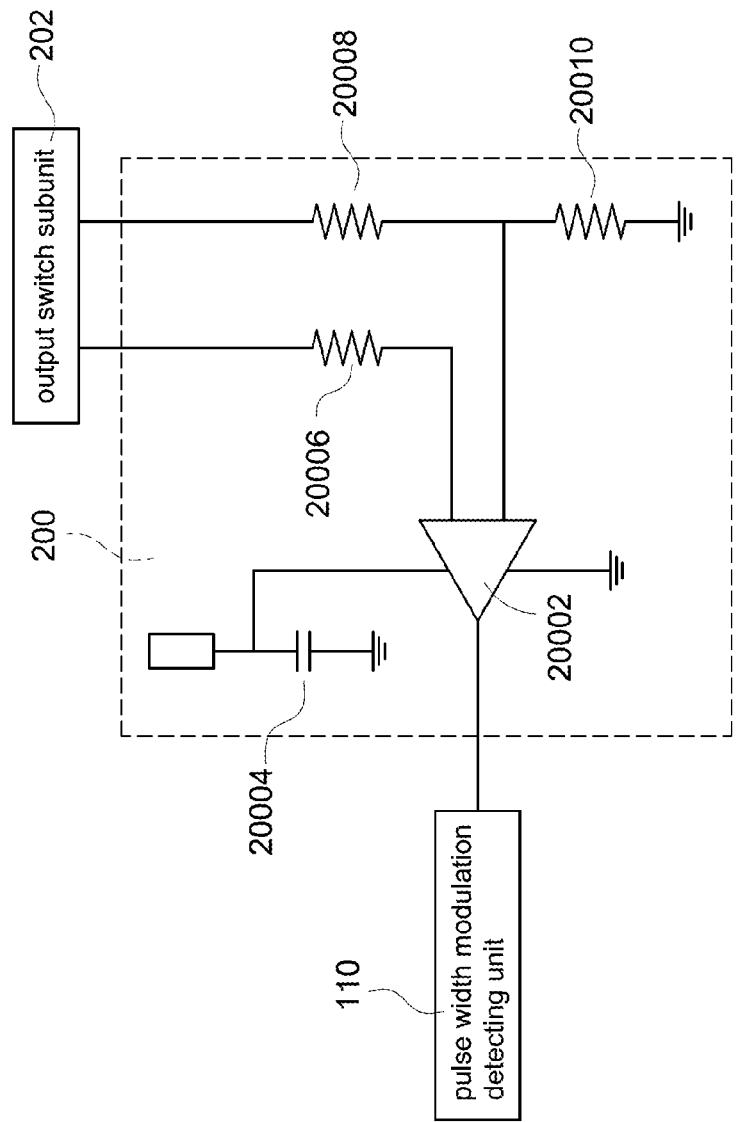
FIG. 6 shows a circuit diagram of the transistor switch detecting unit of the power supply apparatus of the present invention.

FIG. 6 shows a circuit diagram of the transistor switch detecting unit of the power supply apparatus of the present invention. The transistor switch detecting unit 200 comprises a comparator 20002, a third capacitor 20004, a third resistor 20006, a fourth resistor 20008 and a fifth resistor 20010.

The comparator 20002 is electrically connected to the pulse width modulation detecting unit 110. The third capacitor 20004 is electrically connected to the comparator 20002. The third resistor 20006 is electrically connected to the comparator 20002. The fourth resistor 20008 is electrically connected to the comparator 20002. The fifth resistor 20010 is electrically connected to the comparator 20002 and the fourth resistor 20008.

Figure 4:
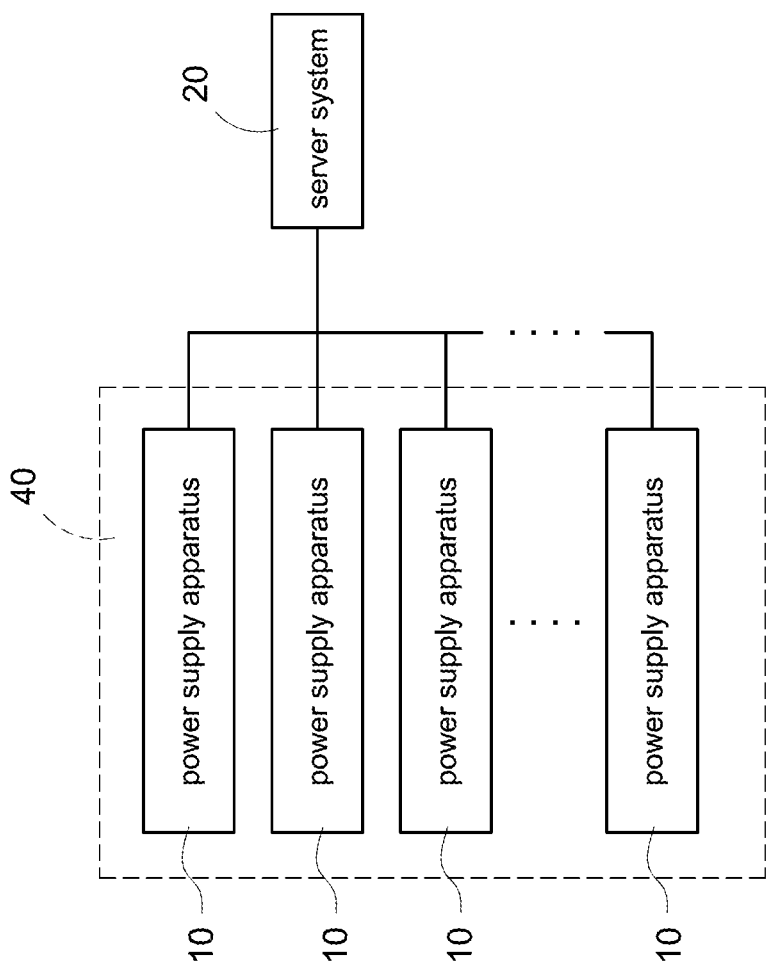
FIG. 4 shows a block diagram of an embodiment of the redundant power supply system of the present invention.
Figure 7:
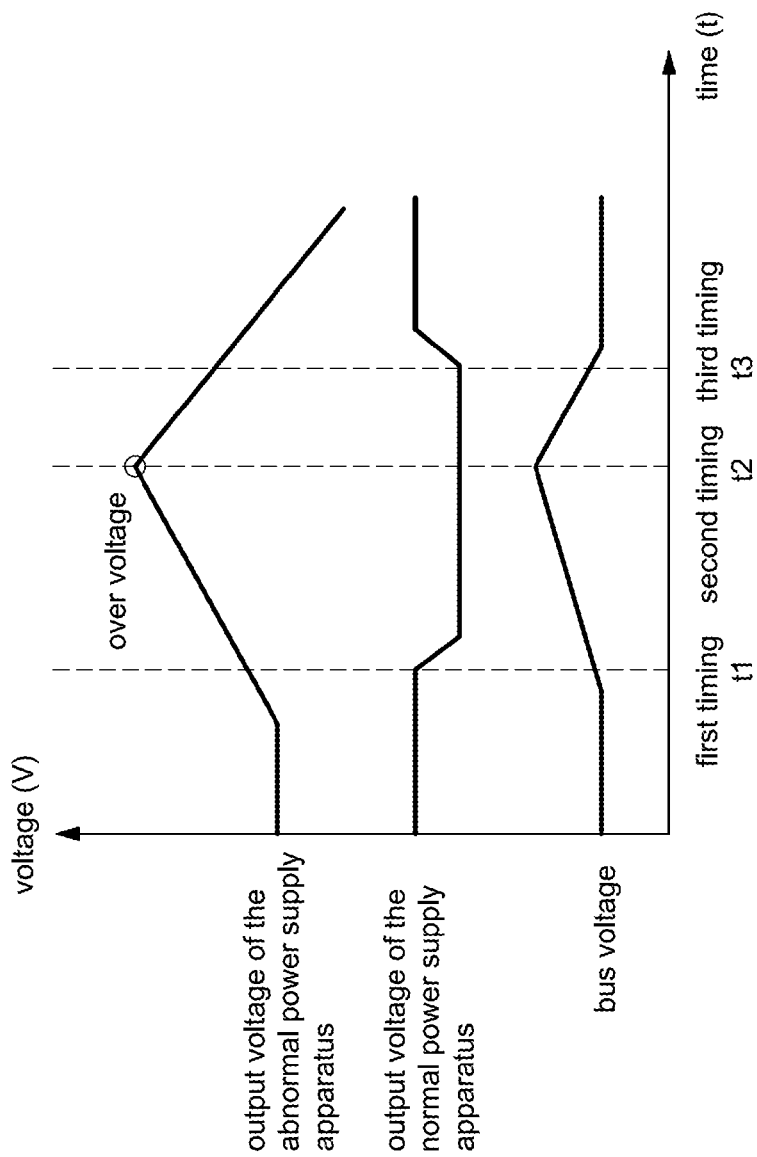
FIG. 7 shows a waveform diagram of the output voltage and the bus voltage of the power supply apparatuses of the redundant power supply system of the present invention.

FIG. 7 shows a waveform diagram of the output voltage and the bus voltage of the power supply apparatuses of the redundant power supply system of the present invention. FIG. 4 shows a block diagram of an embodiment of the redundant power supply system of the present invention. Please refer to FIG. 1 at the same time.

A redundant power supply system 40 comprises a plurality of power supply apparatuses 10 with protection functions. The power supply apparatuses 10 (as shown in FIG. 1) are connected in parallel and have a bus voltage 400 and together output a direct current power to a server system 20. The power supply apparatus 10 comprises a pulse width modulation control unit 108, a pulse width modulation detecting unit 110, a switch unit 104 and a feedback circuit 106. The feedback circuit 106 detects a bus voltage 400. The switch unit 104 comprises a secondary side rectifying switch subunit 102, an output switch subunit 202 and a first capacitor 204.

The pulse width modulation detecting unit 110 is electrically connected to the pulse width modulation control unit 108. The switch unit 104 is electrically connected to the pulse width modulation detecting unit 110. The feedback circuit 106 is electrically connected to the pulse width modulation control unit 108 and the switch unit 104. The secondary side rectifying switch subunit 102 is electrically connected to the pulse width modulation detecting unit 110. The output switch subunit 202 is electrically connected to the secondary side rectifying switch subunit 102, the pulse width modulation detecting unit 110 and the feedback circuit 106. The first capacitor 204 is electrically connected to the secondary side rectifying switch subunit 102 and the output switch subunit 202.

When an output voltage 400 of one of the power supply apparatuses 10 is increased abnormally (namely, the output voltage 400 of the power supply apparatuses 10 is increased and greater than a predetermined voltage), the bus voltage 402 continues to increase due to the abnormal power supply apparatus 10, as shown at a first timing t1 in FIG. 7. After the feedback circuit 106 of the normal power supply apparatus 10 detects that the bus voltage 402 is increased abnormally, the feedback circuit 106 of the normal power supply apparatus 10 sends an informing signal 404 to the pulse width modulation control unit 108. After the pulse width modulation control unit 108 receives the informing signal 404, the pulse width modulation control unit 108 adjusts a duty cycle of a pulse width modulation signal 406 and sends the pulse width modulation signal 406 to the pulse width modulation detecting unit 110. When the pulse width modulation detecting unit 110 detects that the duty cycle of the pulse width modulation signal 406 is less than a predetermined cycle, the pulse width modulation detecting unit 110 turns off the output switch subunit 202 to stop outputting power and to decrease the output voltage 400. At the same time, the secondary side rectifying switch subunit 102 is turned on, so that the output voltage 400 of the normal power supply apparatus 10 is not decreased to 0 volt. When the output switch subunit 202 is re-turned on, the output voltage 400 can be recovered to a standard voltage quickly.

When the output voltage 400 of one of the power supply apparatuses 10 is increased abnormally (namely, the output voltage 400 of the power supply apparatuses 10 is increased to a critical point) such that the output voltage 400 is over voltage, at a second timing t2 as shown in FIG. 7, the abnormal power supply apparatuses 10 starts a self-protected mechanism (for example but not limited to, an over-voltage protection) to stop outputting power and to decrease the output voltage 400. The feedback circuit 106 of the normal power supply apparatus 10 detects that the bus voltage 402 starts to be decreased. When the bus voltage 402 is decreased to the predetermined voltage, at a third timing t3 as shown in FIG. 7, the feedback circuit 106 of the normal power supply apparatus 10 sends a recovery signal 408 to the pulse width modulation control unit 108. After the pulse width modulation control unit 108 receives the recovery signal 408, the pulse width modulation control unit 108 sends a pulse width modulation recovery signal 410 to the pulse width modulation detecting unit 110. After the pulse width modulation detecting unit 110 receives the pulse width modulation recovery signal 410, the pulse width modulation detecting unit 110 re-turns on the output switch subunit 202 to output power. At the same time, the secondary side rectifying switch subunit 102 is turned on, so that the output voltage 400 can be recovered to the standard voltage quickly.

When the pulse width modulation detecting unit 110 turns off the switch unit 104 to stop outputting power, the pulse width modulation detecting unit 110 turns off the secondary side rectifying switch subunit 102 or turns off the output switch subunit 202, or in another embodiment, the pulse width modulation detecting unit 110 turns off the secondary side rectifying switch subunit 102 and the output switch subunit 202 at the same time.

When the transistor switch detecting unit 200 detects that the bus voltage 402 is greater than the predetermined voltage, the transistor switch detecting unit 200 turns off the output switch subunit 202 to stop outputting power to avoid the reverse current phenomenon.

The advantage of the present invention is that when the bus voltage 402 is greater than the predetermined voltage, and when the duty cycle of the pulse width modulation signal 406 is less than the predetermined cycle, the power supply apparatus 10 stops outputting power to avoid the reverse current phenomenon.

Although the present invention has been described with reference to the preferred embodiment thereof, it will be understood that the invention is not limited to the details thereof.

Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus with a protection function comprising:
   a pulse width modulation control unit,;
   a pulse width modulation detecting unit electrically connected to the pulse width modulation control unit;
   a switch unit electrically connected to the pulse width modulation detecting unit; and
   a feedback circuit electrically connected to the pulse width modulation control unit and the switch unit, the feedback circuit detecting a bus voltage,
   wherein when the feedback circuit detects that the bus voltage is greater than a predetermined voltage, the feedback circuit sends an informing signal to the pulse width modulation control unit; after the pulse width modulation control unit receives the informing signal, the pulse width modulation control unit adjusts a duty cycle of a pulse width modulation signal and sends the pulse width modulation signal to the pulse width modulation detecting unit;
   when the pulse width modulation detecting unit detects that the duty cycle of the pulse width modulation signal is less than a predetermined cycle, the pulse width modulation detecting unit turns off the switch unit to stop outputting power.

2. The power supply apparatus in claim 1, wherein the pulse width modulation detecting unit comprises:
   a pulse width modulation signal comparator;
   a first transistor switch subunit electrically connected to the pulse width modulation signal comparator;
   a second transistor switch subunit electrically connected to the pulse width modulation signal comparator and the first transistor switch subunit; and
   a charge pump subunit electrically connected to the first transistor switch subunit and the second transistor switch subunit,
   wherein the charge pump subunit comprises:
   a transistor switch component; and
   a charge pump capacitor electrically connected to the transistor switch component.

3. The power supply apparatus in claim 2, wherein the switch unit comprises:
   a secondary side rectifying switch subunit electrically connected to the pulse width modulation detecting unit;
   an output switch subunit electrically connected to the secondary side rectifying switch subunit, the pulse width modulation detecting unit and the feedback circuit; and
   a first capacitor electrically connected to the secondary side rectifying switch subunit and the output switch subunit.

4. The power supply apparatus in claim 3 further comprising:
   a transistor switch detecting unit electrically connected to the pulse width modulation detecting unit and the output switch subunit.

5. The power supply apparatus in claim 2, wherein the switch unit further comprises:
   a secondary side rectifying switch subunit electrically connected to the pulse width modulation detecting unit.

6. The power supply apparatus in claim 2, wherein the switch unit further comprises:
   an output switch subunit electrically connected to the pulse width modulation detecting unit and the feedback circuit.

7. The power supply apparatus in claim 6 further comprising:
   a transistor switch detecting unit electrically connected to the pulse width modulation control unit and the output switch subunit.

8. The power supply apparatus in claim 2 further comprising:
   a primary side rectifying circuit electrically connected to the pulse width modulation control unit; and
   a transformer electrically connected to the primary side rectifying circuit and the switch unit,
   wherein the feedback circuit comprises:
   a first resistor electrically connected to the switch unit and the transistor switch detecting unit; and
   a second resistor electrically connected to the pulse width modulation control unit and the first resistor.

9. The power supply apparatus in claim 8, wherein the primary side rectifying circuit comprises:
   a first inductor electrically connected to the transformer;
   a first transistor switch electrically connected to the first inductor;
   a second transistor switch electrically connected to the first inductor and the first transistor switch;
   a third transistor switch electrically connected to the first inductor, the first transistor switch and the transformer;
   a fourth transistor switch electrically connected to the first inductor, the second transistor switch, the third transistor switch and the transformer; and
   a second capacitor electrically connected to the first transistor switch, the second transistor switch, the third transistor switch and the fourth transistor switch.

10. The power supply apparatus in claim 9, wherein the secondary side rectifying switch subunit comprises:
    a second inductor electrically connected to the output switch subunit, the first capacitor and the transformer;
    a fifth transistor switch electrically connected to the second inductor, the first capacitor and the transformer;
    a third inductor electrically connected to the second inductor, the fifth transistor switch, the output switch subunit, the first capacitor and the transformer; and a sixth transistor switch electrically connected to the third inductor, the first capacitor, the transformer and the fifth transistor switch.

11. The power supply apparatus in claim 10, wherein the transistor switch detecting unit comprises:
   a comparator electrically connected to the pulse width modulation detecting unit;
   a third capacitor electrically connected to the comparator;
   a third resistor electrically connected to the comparator;
   a fourth resistor electrically connected to the comparator; and
   a fifth resistor electrically connected to the comparator and the fourth resistor.

12. A redundant power supply system comprising:
   a plurality of power supply apparatuses with protection functions, the power supply apparatuses connected in parallel and having a bus voltage and together outputting a direct current power,
   wherein the power supply apparatus comprises:
   a pulse width modulation control unit;
   a pulse width modulation detecting unit electrically connected to the pulse width modulation control unit;
   a switch unit electrically connected to the pulse width modulation detecting unit; and
   a feedback circuit electrically connected to the pulse width modulation control unit and the switch unit, the feedback circuit detecting a bus voltage,
   wherein the switch unit comprises:
   a secondary side rectifying switch subunit electrically connected to the pulse width modulation detecting unit;
   an output switch subunit electrically connected to the secondary side rectifying switch subunit, the pulse width modulation detecting unit and the feedback circuit; and
   a first capacitor electrically connected to the secondary side rectifying switch subunit and the output switch subunit,
   wherein when an output voltage of one of the power supply apparatuses is increased abnormally such that the bus voltage is increased abnormally, and the feedback circuit of the normal power supply apparatus detects that the bus voltage is increased abnormally, the feedback circuit of the normal power supply apparatus sends an informing signal to the pulse width modulation control unit; after the pulse width modulation control unit receives the informing signal, the pulse width modulation control unit adjusts a duty cycle of a pulse width modulation signal and sends the pulse width modulation signal to the pulse width modulation detecting unit; when the pulse width modulation detecting unit detects that the duty cycle of the pulse width modulation signal is less than a predetermined cycle, the pulse width modulation control unit turns off the output switch subunit to stop outputting power and to decrease the output voltage, and at the same time, the secondary side rectifying switch subunit is turned on, so that the output voltage of the normal power supply apparatus is not decreased to 0 volt.

13. The redundant power supply system in claim 12, wherein when the output voltage of one of the power supply apparatuses is increased abnormally and over voltage, the abnormal power supply apparatuses starts a self-protected mechanism to decrease the output voltage; after the feedback circuit of the normal power supply apparatus detects that the bus voltage is decreased, the feedback circuit of the normal power supply apparatus sends a recovery signal to the pulse width modulation control unit; after the pulse width modulation control unit receives the recovery signal, the pulse width modulation control unit sends a pulse width modulation recovery signal to the pulse width modulation detecting unit; after the pulse width modulation detecting unit receives the pulse width modulation recovery signal, the pulse width modulation detecting unit re-turns on the output switch subunit to output power.

* * * * *